United States Patent [19]
Palmer et al.

[11] Patent Number: 5,585,829
[45] Date of Patent: Dec. 17, 1996

[54] APPARATUS AND METHOD FOR PRINTING CHARACTERS UTILIZING STORED ALGORITHMS

[75] Inventors: Mathew R. Palmer, Cambridge; Ian Thompson-Bell, Royston, both of United Kingdom

[73] Assignee: Esselte N.V., St. Niklass, Belgium

[21] Appl. No.: 349,756

[22] Filed: Dec. 5, 1994

[30] Foreign Application Priority Data

Dec. 6, 1993 [GB] United Kingdom ............ 9324976

[51] Int. Cl.$^6$ ............................................. B41J 2/315
[52] U.S. Cl. ............................................. 347/171
[58] Field of Search ............................. 347/171, 183, 347/188; 235/375; 400/611, 120.01, 615.2; 358/261.1, 261.2, 261.3, 296, 298, 297; 395/88; 156/384

[56] References Cited

U.S. PATENT DOCUMENTS 4,992,954  2/1991  Takeda et al. ............ 364/518

FOREIGN PATENT DOCUMENTS

| 0082297 | 11/1982 | European Pat. Off. . |
| 0506101 | 9/1992 | European Pat. Off. . |
| 05265428 | 10/1993 | Japan . |
| 92/09438 | 6/1992 | WIPO . |

*Primary Examiner*—Benjamin R. Fuller
*Assistant Examiner*—L. Anderson
*Attorney, Agent, or Firm*—Pennie & Edmonds

[57] ABSTRACT

An apparatus and method for printing characters that minimizes the information that needs storage for each character that can be printed. The apparatus according to the invention uses a storage device containing font data for the characters and identifiers which identify an algorithm to be used for recreating the character. A processor coupled to the storage device generates pixel data for printing based on the stored font data, an identifier, and one of multiple

19 Claims, 4 Drawing Sheets

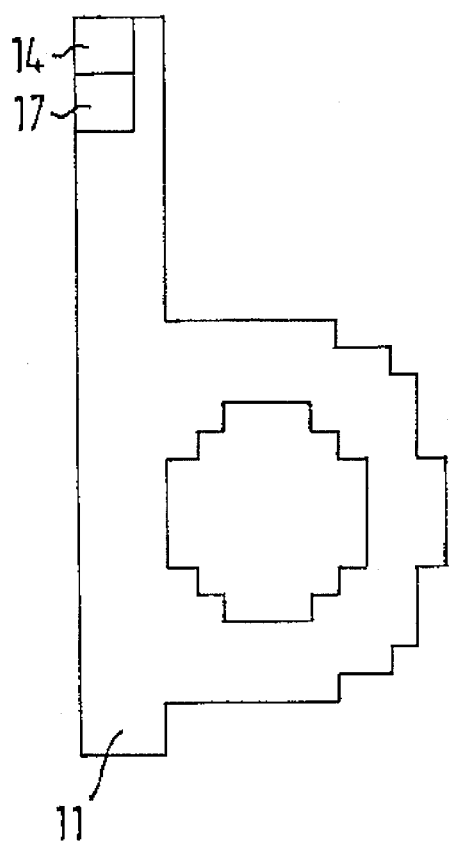
FIG. 5A
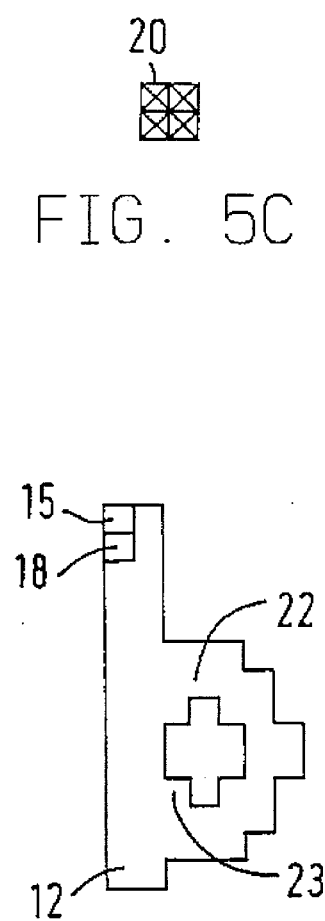
FIG. 5C
FIG. 5B
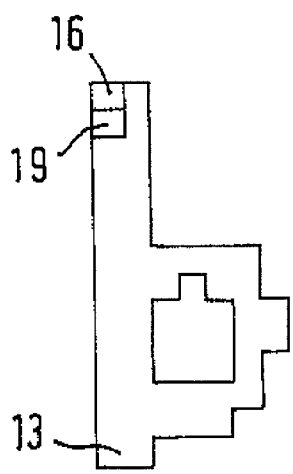
FIG. 5D
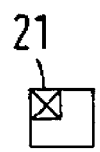
FIG. 5E

APPARATUS AND METHOD FOR PRINTING CHARACTERS UTILIZING STORED ALGORITHMS

FIELD OF THE INVENTION

The present invention relates to a printing apparatus and method of printing characters.

The invention is particularly but not exclusively applicable to the printing apparatus which are known as label printers. These apparatus have a printing mechanism formed by a thermal printhead cooperating with a platen. An ink ribbon and a printing tape extend in overlap between the thermal printhead and the platen, and the printing tape is moved past the thermal printhead during printing. The printhead comprises a column of printing elements each of which can be separately activated to print a column of pixels on the printing tape widthwise of the tape. Known printing apparatus include an input device for entering characters to be printed, for example a keyboard, a display such as a liquid crystal display (LCD) to enable a user to see the characters that he has entered and to thereby formulate a message to be printed on a label and a cutting mechanism for cutting off a portion of the printed tape after use to form a label. The printing tape has a peelable backing layer so that it can be used as a label by removing the peelable backing layer and securing the image receiving layer to an article by the remaining adhesive on its rear. The printing apparatus accommodates a cassette housing printing tape and an ink ribbon or, alternatively, two cassettes housing respectively printing tape and ink ribbon. Printing apparatus of this type are known and are disclosed for example in U.S. patent applications Ser. Nos. 07/795,325 and 08/067,363, the contents of which are herein incorporated by reference.

BACKGROUND TO THE INVENTION

One restriction which is imposed on printing apparatus of this type is that they are normally intended to be portable and are therefore small. This imposes a limitation on the amount of memory which is available within the printing apparatus. These printing apparatus are controlled by a microprocessor chip. It is advantageous if the memory space which is made available on the microprocessor chip is sufficient to store all of the necessary font data and program code for running the printing apparatus. This is discussed in our earlier Application PCT/GB91/02126. This requires that font data which is stored to define the characters to be printed is stored in compressed form. There are many ways in which compression of font data can occur. However, any compression technique which works well for some characters often does not work well for others and can, in some cases, actually increase the amount of memory required to store the character. Therefore, even printing apparatus which do use font compression techniques are not able to reduce the storage capacity which is required to a minimum.

There is, moreover, normally a requirement for reduced size characters, such as half size characters. While it is theoretically quite possible (and some printing apparatus do this) to store font data defining the half size characters separately from font data defining the full size characters, this once again increases the storage requirements of the printing apparatus. An alternative is to derive the half size characters from font data stored for the full sized character. However, these half sized characters vary in their quality of appearance because a common "half size" algorithm is used to produce all of the characters which, while rendering faithful half size versions of some characters distorts others.

SUMMARY OF THE INVENTION

The present invention has as its object to reduce the amount of storage capability which is required to store font data for characters to be printed while nevertheless enabling characters to be reproduced and printed with a good appearance.

According to the present invention there is provided a printing apparatus comprising:

printing means for printing characters onto a printing medium;

storage means for storing font data defining characters to be printed, the font data for each character enabling the character to be recreated according to a predetermined algorithm; and processing means coupled to the storage means and to the printing means for generating pixel data defining a character selected for printing;

characterized in that the storage means holds with the font data for each character an identifier which identifies said predetermined algorithm from a plurality of algorithms and the processing means is operable to generate said pixel data defining said selected character accordingg to said predetermined algorithm identified by the identifier.

In one aspect, the invention is applicable to the recreation of full size characters from font data defining the character in compressed form as a result of a predetermined compression algorithm. The recreation algorithms for recreating the character can also be stored in the storage means.

In another aspect, the invention is applicable to the recreation of reduced size characters from font data defining the character. In that case, there is a common recreation algorithm which uses a pixel mask to reduce a selected plurality of pixels to a reduced number. For the recreation of half size characters the number of pixels is reduced from four to one. The pixel mask is selected from a plurality of pixel masks according to the stored identifier.

These aspects can be used together, that is font data for a character can be stored with a first identifier identifying the recreation algorithm and a second identifier identifying the pixel mask for a reduced size character. Thus the second identifier identifies a reduction algorithm by selecting a pixel mask for implementing the common recreation algorithm.

The invention also provides a method of printing characters comprising the steps of:

storing font data defining characters to be printed, the font data for each character enabling the character to be recreated for printing according to a predetermined algorithm;

selecting a character to be printed;

processing the font data for the selected character according to the predetermined algorithm to generate pixel data; and supplying the resultant pixel data to a printing means for printing on a printing medium;

characterized in that the font data for each character is stored with an identifier which identifies said predetermined algorithm from a plurality of algorithms and in that the step of processing the font data comprises processing the font data according to the algorithm identified by the identifier to generate said pixel data for printing.

The printing means can comprise a thermal printhead and a cooperative platen. The thermal printhead can have one or more columns of printing elements which can be selectively activated according to the pixel data.

The printing medium can be a printing tape with a peelable backing layer. Where the printing means is a thermal printhead, the printing tape can be arranged to move in overlap with an ink ribbon between the thermal printhead and the platen, the characters being printed on a column by column basis as the printing tape moves.

The invention is particularly applicable where the printing apparatus is a label printer which accommodates one or more cassettes. A single cassette can house a printing tape and an ink ribbon and, optionally, an adhesive protective layer or double sided adhesive backing layer. Alternatively, two cassettes can be provided housing respectively ink ribbon and printing tape. In both cases, the printing tape and the ink ribbon are arranged to be passed in overlap between the thermal printhead and the platen.

Preferably, the printing apparatus includes cutting means for cutting off a portion of the printing tape to provide a label.

The printing apparatus preferably also comprises selection means for selecting characters to be printed, e.g. in the form of a keyboard.

For a better understanding of the present invention, and to show how the same may be carried into effect, reference will now be made by way of example to the accompanying drawings.

BRIEF DESCRIPTION OF THE DRAWINGS

FIGS. 5A through 5E illustrate different forms of a lower case b to illustrate production of half size characters.

DESCRIPTION OF THE PREFERRED EMBODIMENTS

Figure 1A:
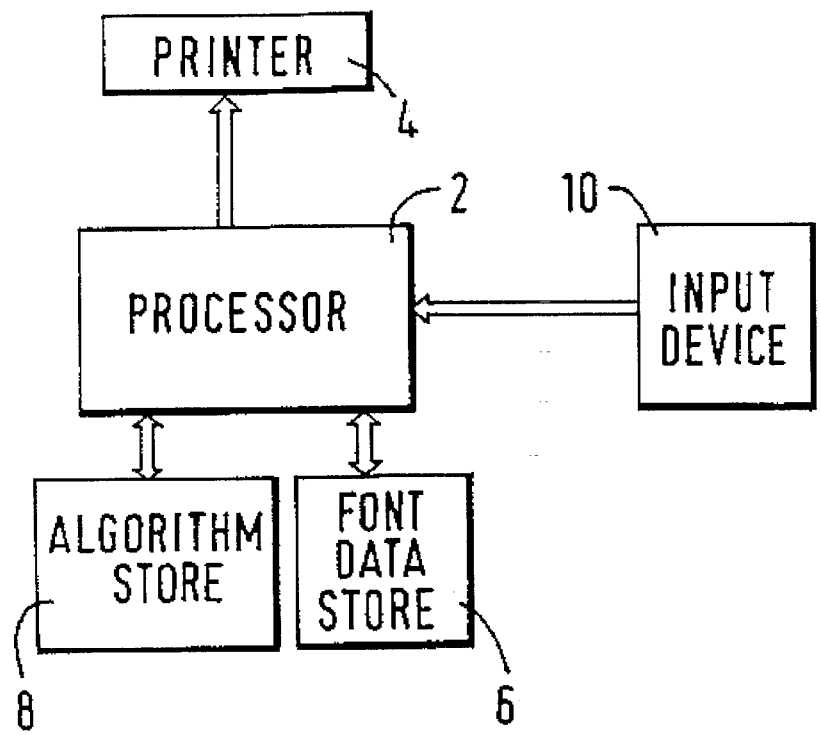
FIG. 1A is a diagram of the main operative elements of a printing apparatus according to one embodiment of the invention, with FIG. 1B being an enlarged view of the internal structure of the font data.
Figure 1B:
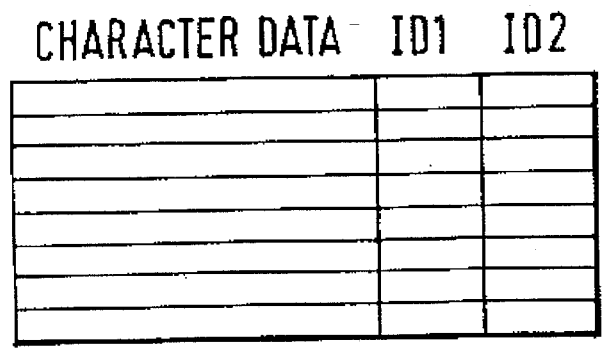

Reference is first made to FIGS. 1A and 1B which show the main operative elements required to implement the present invention in a printing apparatus. In FIG. 1A, reference numeral 2 denotes a central processor for the printing apparatus which would normally be implemented as a microprocessor. The processor 2 is connected to drive a printer 4, the printer 4 being a thermal printhead in the preferred embodiment. As is well known, a thermal printhead comprises a column of printing elements each of which can be actuated individually. In a so-called label printer of the type described in the U.S. Pat. No. 5,424,757, the content of which is expressly incorporated herein by reference thereto, printing tape is moved past the thermal printhead, with the column of printing elements extending across the width of the printing tape so that adjacent columns are printed in the direction of movement of the tape. Movement of the tape past the printhead 4 can be by rotating a platen which cooperates with the printhead for printing. The tape is housed in a tape cassette located in the printing apparatus. Characters are created by sequential transfer of pixel data from the processor to the thermal printhead 4 on a column by column basis. The processor is connected to a font data store 6 which stores font data defining a plurality of characters which can be printed. The processor is also connected to an algorithm store 8 which stores recreation algorithms for the characters in a manner to be described in more detail hereinafter. It will readily be appreciated that the location and connection of the font data store 6 and the algorithm store 8 is indicated diagrammatically only. In practice, these stores could both be implemented in the memory of the microprocessor chip itself. The printing apparatus has an input device 10 which enables the user to manually select characters for printing. The input device 10 can comprise a keyboard or similar input device for selecting characters.

FIG. 1B denotes the internal structure of the font data store 6 which will be described in more detail hereinafter.

In operation, a character to be printed is selected at the input device 10 and font data defining that character is retrieved by the processor 2 from the font data store 6. The processor then recreates the character from the font data using an algorithm from the algorithm store 8 and passes the generated pixel data to the printer on a column by column basis, each column including a plurality of pixels.

The font data store 6 holds, for each character, font data in compressed form defining the character and first and second identifiers. In FIG. 1B, these are illustrated as though each character occupies a separate row in the font data store, but the layout of the font data store can be selected at choice. It is important only that the compressed font data defining each character is stored in association with at least a first or a second identifier. The function of the first identifiers will firstly be described.

The first identifier stored with each character is a number which the processor 2 utilizes to determine which of a plurality of algorithms in the algorithm store 8 should be used to recreate the character. In a particular embodiment, half of a byte is used to store this number and a maximum of 16 different algorithms can be identified. The first identifier is identified ID1 in the present description. The purpose of the first identifier ID1 is to identify an algorithm for recreation of the character for printing which is related to the way in which the compressed font data was derived from the character. The compression algorithm which is applied to provide the compressed font data for a particular character can be selected to minimize the amount of character data required to be stored for each character. Thus, each character can be stored in a manner which reduces rather than increases the amount of memory used to store it. The first identifier stored with the compressed font data for the character is used to identify the algorithm needed to recreate the character in correspondence with the compression algorithm which was used to provide the compressed font data for storage. The most appropriate compression method to use with a particular character is determined experimentally in advance by applying several known methods to each character in turn to determine which method requires the least amount of data to define that character. A corresponding recreation algorithm is then assigned a unique number which is stored with that character and used by the microprocessor to recreate the character. The following examples illustrate some of the methods that can be used and the type of characters for which they are useful.

Before specific compression algorithms are discussed, there follows a description of how data is stored in a printing apparatus according to a preferred embodiment of the present invention.

Figure 2:
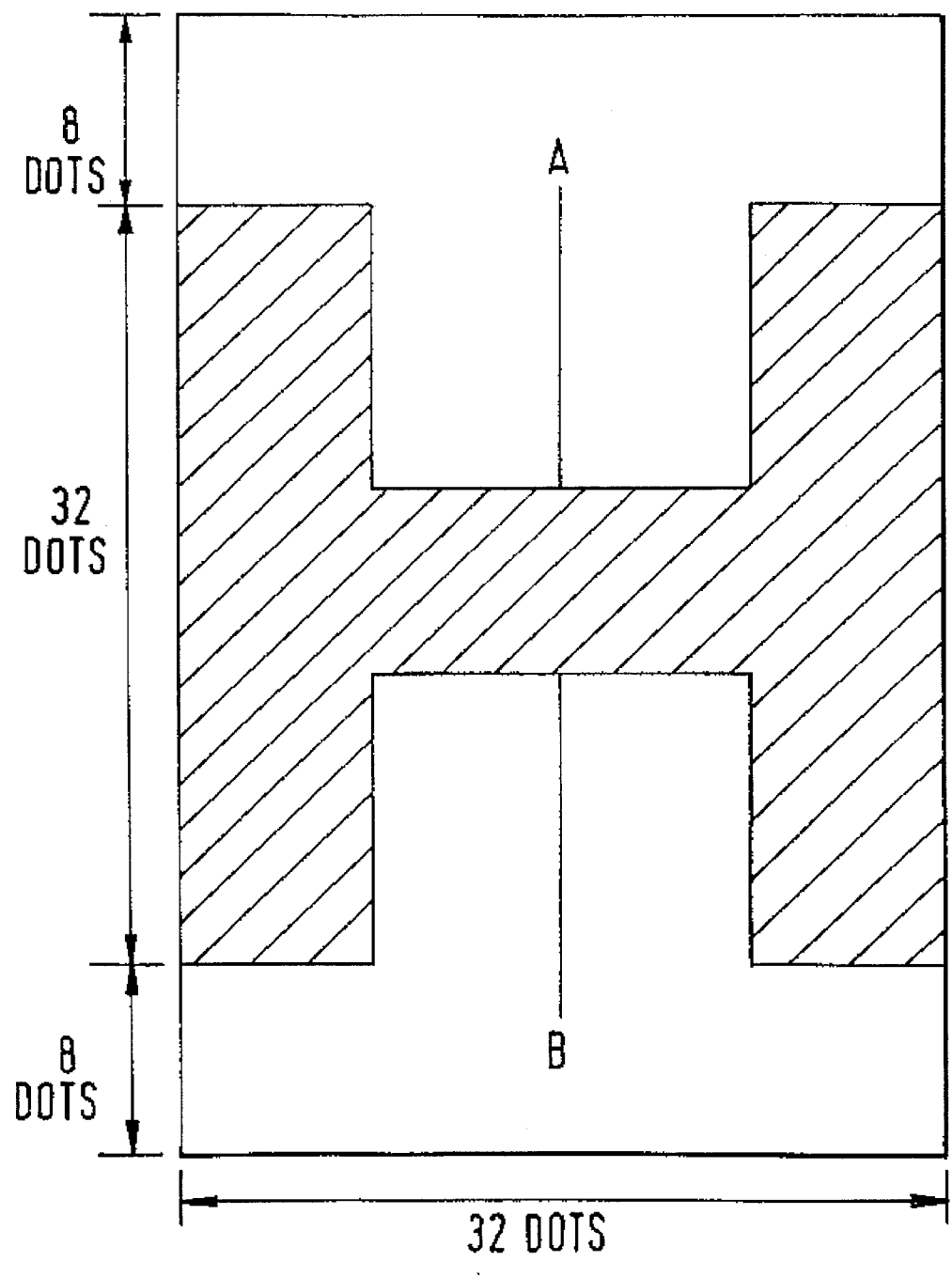
FIG. 2 is a pixel representation of the letter H used to illustrate data compression.

The thermal printhead has a column of 48 printing elements. This represents the maximum pixel height of a character. To store a typical upper case character (say capital H) of size 32 by 32 dots as raw data requires 48 times 32 bits =192 bytes as illustrated in FIG. 2 where the shaded area represents the black dots of the character. A gap of 8 dots is left at the top of the character. This is to allow room for accents, e.g. acute, grave, umlaut etc. above those capital letters that require them. A gap of 8 dots is also left below the character. This is to allow for descenders in lower case characters, e.g. the letters g, y or j. It is also necessary to specify the gap to be left between printed characters. As characters each have different widths, the value of this gap will vary from character to character, if all characters were stored in this 32 dot wide format. Using this method would require about 30 thousand bytes of data to store the entire character set of a typical printing apparatus which comprises over 160 characters. This requirement is reduced by font data compression.

Figure 3:
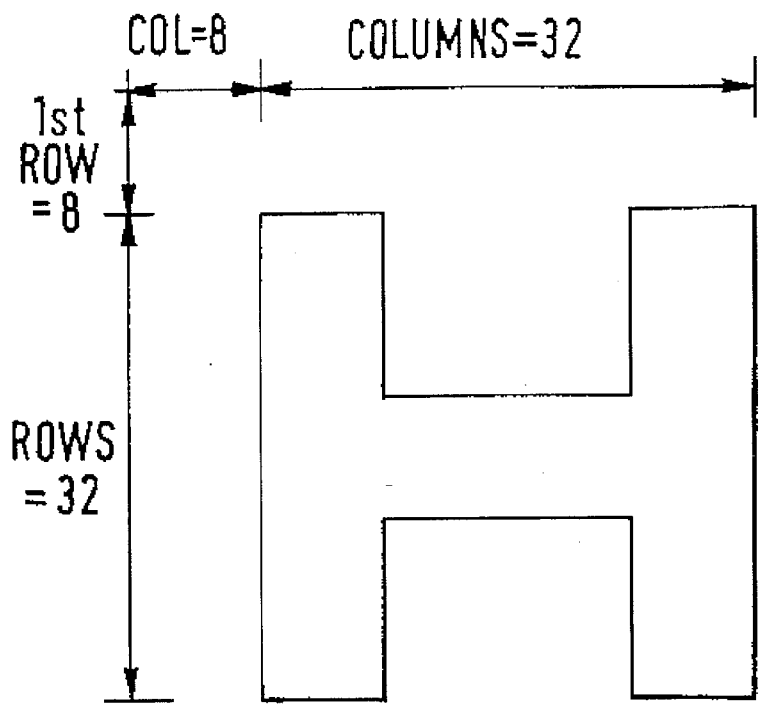
FIG. 3 illustrates a compressed form of the letter H for storage.

The first stage of compression is to take advantage of the fact that all the area around the character is blank and that different characters have different heights and widths. If the number of rows and columns that the character actually occupies and the position of its top left hand corner (as first row number and first column number) are recorded, then the quantity of raw data to be stored is reduced to the size of the character itself. This is illustrated in FIG. 3, which shows the same capital H stored in this format. To store a capital H in this format therefore requires 32×32 bits=128 bytes of raw character data plus one byte each for first column, first row, number of columns and number of rows, i.e. a total of 132 bytes compared with the 192 bytes of FIG. 2. Using this technique reduces the total memory required to store the same character set to about 10K bytes. A further advantage of this method is that the first column value also specifies the gap to be left between this character and the previous one. In FIG. 3 the first column value is 8 dots so the character is printed 8 dots to the left of the previous character. The first row value is 8 dots so the top of the character is 8 dots below the top dot of the printhead.

There is a requirement to reduce the storage requirement still further and this is done by the application of a selected compression algorithm, some examples of which are now given.

Run Length Coding

Run length coding compresses characters by recording the number of successive black or white dots. In one embodiment of run length coding, each successive byte of data records the number of successive black or white dots in a character. One bit in the byte is used to indicate whether the number represents black or white dots. For example, if this bit is set to a logical one, black dots are represented and if it is set to a logical zero, white dots are represented. The remaining 7 bits of the byte are used to represent the number of black or white dots. This number can therefore be in the range of 1 to 128. The run length coding method will be illustrated by considering how it is applied to the compression of the capital letter H of FIG. 2.

First, the first column, first row, number of columns and number of rows values are stored exactly as for an uncompressed character as described above. This requires four bytes of data.

In order to print the character, the microprocessor needs to obtain successive columns of the character, which it sends to the printhead in order to print the character. The microprocessor therefore first requires the left most column of the capital letter H of FIG. 2, followed by the column immediately to the right of this one and so on until the right hand most column is reached. From FIG. 2 it can be seen that the capital letter H begins with 8 consecutive columns each of 32 black dots, i.e. a total of 256 black dots. Since only a maximum of 128 consecutive dots can be represented by one byte with this method, the whole set of 8 columns of 32 black dots cannot be stored in a single byte. Instead, the first compressed byte can represent the first 128 dots by setting to black the bit which represents if black or white dots are being stored. The remaining bits are set to one less than the number of consecutive dots, i.e. 127. One less than the number of consecutive dots is stored because a count of zero dots never occurs. This encodes the first four columns into a single byte. Since the next four columns are identical, the second byte of compressed data is the same as the first. The whole of the first 8 columns of the capital letter H has thereby been compressed into two bytes.

The centre horizontal bar of the capital letter H of FIG. 3 consists of 16 identical columns each one of which consists of 12 consecutive white dots follows by 8 consecutive black dots followed by 12 consecutive white dots. Each column can therefore be encoded as three bytes. The first byte has its bit which represents if black or white dots are stored set to white. The remaining 7 bits of this byte are set to one less than the number of white dots, i.e. 11. Similarly the second byte is set to record 8 black dots and the third to represent 12 white dots. Each of the 16 columns representing the horizontal centre bar of the capital letter H is therefore stored as three bytes. The 16 columns therefore require 16 times 3=48 bytes of storage. Finally, the right hand vertical bar of the capital letter H is identical to the left hand vertical bar and so can similarly be stored in just two bytes. The total number of bytes required to store the capital letter H by this method is therefore 52 bytes compared to the 128 bytes required if run length coding is not used.

Repeated Pattern Coding

Figure 4:
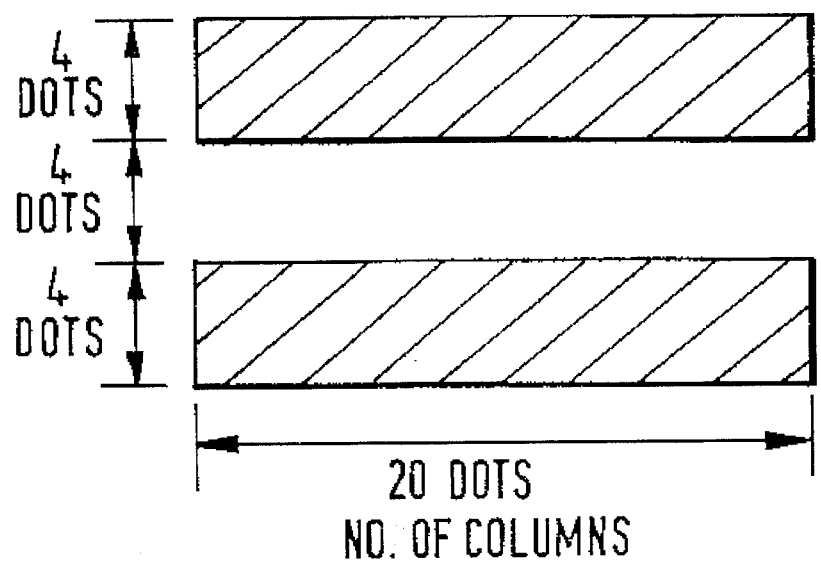
FIG. 4 illustrates an equal sign to illustrate a particular data compression technique.

The above method does not cope very well with characters containing many horizontal lines, e.g. the equals sign "=". This is because every column has several changes from consecutive black to consecutive white dots and vice versa, each change requiring a new byte in the compressed format. FIG. 4 shows an example of an equals sign. This character is 12 dots high and 20 dots wide and therefore requires 12 times 20=240 bits=30 bytes to store it in an uncompressed form. To store this character in run length coding requires 3 bytes per column, i.e. a total of 60 bytes. Run length coding therefore actually increases the amount of data to be stored. A much better method of compressing this character is to use repeated pattern coding. It can be seen that each column of the character consists of the same pattern of 4 black dots followed by four white dots followed by four black dots. This pattern can be stored in just two bytes. One extra byte is used to record the number of bytes in the pattern and the number of times the pattern is repeated. For example, for characters which are usually less than 32 dots wide, five bits of this byte can be reserved to represent the number of times to repeat the pattern. The remaining 3 bits allow patterns up to 8 bytes (64 dots) long to be specified. In this way the equals sign of FIG. 4 can be stored in only 3 bytes; two for the pattern and one to record the pattern length (2 bytes) and the number of times to repeat it (twenty).

The capital letter H of FIG. 2 could also be stored using this method, but more than one pattern needs to be specified. The first 8 columns of this character are each just 32 black dots. Four bytes are required to store this pattern. The byte specifying the number of bytes in the pattern and the number of times the pattern is repeated would record a pattern length of 4 and a repeat number of 8. The first 8 columns of the capital letter H can therefore be compressed by this method into five bytes. The last 8 columns of this letter can be compressed in exactly the same way into a further five bytes. The centre horizontal bar of the capital letter H is a different repeated pattern consisting of 12 white dots then 8 black dots then 12 more white dots. This pattern can be stored in four bytes with one more byte to specify the number of bytes in the pattern and the number of times to repeat it. Using the repeated pattern method, therefore, the capital letter H of FIG. 2 could be compressed to 15 bytes.

Mirror Image Coding

Some characters have properties of symmetry. For example, the capital letter H at FIG. 2 is symmetrical about the line AB. The part of the character to the right of this line is a mirror image of the part of the character to the left of the line. It is therefore only necessary to store the left hand half of the character and indicate to the microprocessor in the half byte used to store the algorithm identifier ID1 representing the method, that the second half of the character is a mirror image of the first half. Mirror image coding is a very useful technique because many characters exhibit vertical symmetry, e.g. capital letters A, H, I, M, O, T, V, W, X, the numbers 0 and 8 and the characters minus "−", plus "+", divide "÷", equals "=", colon ":" and exclamation mark "!".

It is possible to combine more than one compression technique to achieve even greater degrees of compression of the data. For example, using the repeated pattern technique to store the left hand half of the capital letter H of FIG. 2 requires only 10 bytes instead of 15 which would be required to store the entire character as discussed above. If the repeated pattern technique is combined with the mirror image technique, only these 10 bytes are necessary to store the entire character if one code in the half byte which is used as the algorithm identifier ID1 to indicate the method used is used to mean repeated pattern coding followed by mirror image coding. Other codes of this half byte can be used to represent other combinations, e.g. run length coding followed by mirror image coding.

Another possible technique for compressing font data is to use a Bezier technique.

The function of the identifier ID2 for each character is now described.

The printing apparatus can print half size characters as well as full size ones. The character set in both cases is the same, but the half size characters are half the height and half the width of their full size equivalents. The half size characters can be generated directly from the font data for the full size ones, so that no additional memory is required to store them.

Since each half size character is half the width and half the height of the full sized equivalent, each group of 4 dots in the full sized character needs to be converted into a single dot in the half sized character. This is illustrated in FIGS. 5 through 5E which represents the effect of transforming a full size lower case letter b designated by numeral 11 into half size lower case letter b's designated by numerals 12 and 13 using different rules for converting each set of 4 dots in the full size character to a single dot in the half size character. A block 14 of four dots in the full size character 11, as shown in FIG. 5A, are converted to the single dot 15 in the half size character 12 as shown in FIG. 5B, and into the single dot 16 in the half size character 13, as shown in FIG. 5D. Similarly the block 17 of 4 dots in the full size character 11 are converted into the single dot 18 in the half size character 12 and into the single dot 19 in the half size character 13. The half size characters 12 and 13 illustrate the result of applying two different reduction methods to the full size character 11. The reduction rules are defined by appropriate 4 bit pixel masks. That is, a two by two matrix is used to logically manipulate each four bits to derive one bit therefrom, the logical manipulation depending on the bit settings of the matrix. If any of the 4 dots in the block 14 of the full size character 11 is black, then the single dot 15 in the half size character 12 is set to black as illustrated by mask 20 as shown in FIG. 5C. If the top left hand dot of the block of 4 dots 14 of the full size character 11 is black then the single dot 16 in the half size character 13 is set to black as illustrated by mask 21, as shown in FIG. 5E.

The resultant half size characters are significantly different. The set of 3 horizontal dots 22 in the half size character 12 is missing in half size character 13 and the bottom left inner corner dot 23 of half size character 12 is missing in half size character 13. Since there are 16 combinations of one or more dots from a block of 4, there are 16 different half size characters which can be produced depending on what rule is used to provide the dot in the half size character from the block of 4 in the full size character. If a single fixed combination of dots is used to form all half size characters many half sized characters look subjectively unsatisfactory. However, all of these half size characters can be made to look subjectively satisfactory by choosing an appropriate rule for reducing the four dots. The identifier ID2 is a number representing one of the possible 16 combinations of the pixel masks defining how the block of 4 dots is to be used in creating the half size character. Four bits are needed to store this number. The spare half of the byte used as the algorithm identifier ID1 is used to store this number. The total additional memory required to store the half size font for 160 characters is therefore 160 half bytes or 80 bytes. As for the compression algorithm, the best combination of 4 bits to produce a satisfactory half size character is determined experimentally in advance.

The pixel mask is used in the preferred embodiment as follows. Each bit of the mask is logically ANDed with the corresponding bit of a set of four bits of the character. If the result is four zeros then a black dot is not printed. If the results includes a 1 at any location then a black dot is printed. The location of the 1 can of course be determined by the configuration of the selected pixel mask for each character.

What is claimed is:

1. A printing apparatus comprising:

a printing mechanism for printing characters onto a printing medium;

a storage device for storing font data defining characters to be printed, the font data for each character enabling the character to be recreated according to a predetermined algorithm;

an input device for selecting a character for printing; and a processor coupled to the storage device and to the printing mechanism for generating pixel data defining said character selected for printing, wherein the storage device holds with the font data for each character an identifier which identifies said predetermined algorithm from a plurality of algorithms and the processor generates said pixel data defining said selected character according to said predetermined algorithm identified by the identifier.

2. A printing apparatus according to claim 1 wherein said plurality of algorithms includes recreation algorithms for recreating a full size character from font data defining the character in compressed form according to a predetermined compression algorithm.

3. A printing apparatus according to claim 2 wherein the recreation algorithms for recreating the characters are stored in the storage device.

4. A printing apparatus according to claim 2 wherein the recreation algorithms are selected from the group consisting of a run length code algorithm, a repeated pattern code algorithm and a mirror image code algorithm.

5. A printing apparatus according to claim 1 wherein the processor recreates a reduced size character from font data defining the character according to a common recreation algorithm which uses one of a plurality of pixel masks to reduce a selected plurality of pixels to a reduced number, wherein the pixel mask is selected from the plurality of pixel masks according to the stored identifier thereby to select a reduction algorithm as said predetermined algorithm.

6. A printing apparatus according to claim 1 wherein the printing mechanism comprises a thermal printhead and a cooperative platen.

7. A printing apparatus according to claim 1 wherein the printing medium is a printing tape with a peelable backing layer.

8. A printing apparatus according to claim 1 which accommodates one or more cassettes.

9. A printing apparatus according to claim 1 which includes a cutter for cutting off a portion of the printing medium to provide a label.

10. A printing apparatus comprising:

a printing mechanism for printing characters onto a printing medium;

a storage device for storing font data defining characters to be printed, the font data for each character enabling the character to be recreated according to a predetermined algorithm;

an input device for selecting a character for printing; and a processor coupled to the storage device and to the printing mechanism for generating pixel data defining said character selected for printing;

wherein the storage device holds with the font data for each character an identifier which identifies a reduction algorithm as said predetermined algorithm by selecting a pixel mask from a plurality of pixel masks and wherein the processor generates said pixel data defining said selected character in reduced form according to said reduction algorithm by applying a common recreation algorithm which uses said selected one of said plurality of pixel masks to reduce a selected plurality of pixels to a reduced number.

11. A printing apparatus according to claim 10 wherein font data for a character is stored with an additional identifier for identifying one of a plurality of recreation algorithms for recreating said character.

12. A printing apparatus according to claim 10 wherein the printing mechanism comprises a thermal printhead and a cooperative platen.

13. A printing apparatus according to claim 10 wherein the printing medium is a printing tape with a peelable backing layer.

14. A printing apparatus according to claim 10 which accommodates one or more cassettes housing said printing medium.

15. A printing apparatus according to claim 10 which includes a cutter for cutting off a portion of the printing medium to provide a label.

16. A method of printing characters comprising the steps of:

storing font data defining characters to be printed, the font data for each character enabling the character to be recreated according to a predetermined algorithm and being stored with an identifier of said predetermined algorithm;

selecting the character to be printed;

processing the font data for the selected character according to the predetermined algorithm identified by the identifier to generate pixel data; and supplying the resultant pixel data to a printing means for printing the selected character or characters.

17. A method according to claim 16 wherein said predetermined algorithm is selected from a plurality of recreation algorithms for recreating a full size character from font data defining the character in compressed form according to a predetermined compression algorithm.

18. A method according to claim 16 wherein said predetermined algorithm is a common recreation algorithm which uses one of a plurality of pixel masks to reduce a selected plurality of pixels to a reduced number, wherein the pixel mask is selected from the plurality of pixel masks according to the stored identifier, thereby to select a predetermined reduction algorithm.

19. A method according to claim 16 wherein the font data for each character is stored with a first identifier for identifying one of a plurality of recreation algorithms and a second identifier for identifying one of a plurality of pixel masks to be used with a common recreation algorithm for producing reduced size characters.

\* \* \* \* \*